United States Patent [19]

West

[11] 4,139,900
[45] Feb. 13, 1979

[54] GROUND STATION DATA STORAGE SYSTEM

[75] Inventor: Louis R. West, Willingboro, N.J.

[73] Assignee: RCA Corporation, New York, N.Y.

[21] Appl. No.: 734,412

[22] Filed: Oct. 21, 1976

[51] Int. Cl.$^2$ .............................................. G04F 10/00
[52] U.S. Cl. .................................. 364/900; 324/186; 235/92 T
[58] Field of Search ....................... 364/900 MS File; 324/186; 235/92 T, 92 TP

[56] References Cited

U.S. PATENT DOCUMENTS

| | | | |
|---|---|---|---|
| 3,434,115 | 3/1969 | Chomiki | 364/900 |
| 3,656,060 | 4/1972 | Bauernfeind et al. | 324/186 |
| 3,699,459 | 10/1972 | Watson | 324/186 X |
| 3,773,038 | 11/1973 | Smith et al. | 324/186 X |
| 3,835,383 | 9/1974 | Crofford | 324/186 |
| 3,876,867 | 8/1975 | Schull et al. | 235/92 T |
| 3,889,189 | 6/1975 | Lode | 324/86 |
| 3,969,616 | 7/1976 | Mimken | 324/186 X |
| 3,984,662 | 10/1976 | Sorenson | 235/92 T X |

Primary Examiner—Mark E. Nusbaum
Attorney, Agent, or Firm—H. Christoffersen; Samuel Cohen; Carl V. Olson

[57] ABSTRACT

Data relating to the attitude and spin rate of a spacecraft is stored in a data storage system located at an earth station in communication with the spacecraft. Leading and trailing edges of the data, usually in the form of pulses, received from sensors suitably mounted on the spacecraft, address locations in a random access memory (RAM) into which the count accumulated in a counter is written. At the end of each group of pulses, referred to as a frame, data relating to the status of the pulses received from the spacecraft is also loaded into the random access memory. Simultaneously, a computer is signalled that a complete frame of data has been loaded in the random access memory. The computer then generates address and other signals such that the data can be read out of memory and thereby allow the computer to calculate the attitude and spin rate of the spacecraft.

5 Claims, 3 Drawing Figures

GROUND STATION DATA STORAGE SYSTEM

BACKGROUND OF THE INVENTION

1. Field of the Invention

This invention relates to a data storage system for an earth station and more particularly to the storage of data representing the attitude and spin rate of the spacecraft.

2. Description of the Prior Art

During all phases of satellite operation including the transfer orbit and on-orbit maneuvers such as station keeping, data from the spacecraft is examined at ground stations to determine if the spacecraft is properly performing in its intended mission. Among the data examined are the output of various sensors located on the satellite, relating to spacecraft attitude and spin rate. The output of these sensors, which are usually in the form of pulses, are transmitted from the satellite to a receiver located at a ground station. The equipment located at the ground station must establish the time relationship between the leading and trailing edges of the various sensor pulses so that a programmed digital computer may be used to calculate spacecraft attitude and spin rate. The attitude is determined by the computer from the times of occurrence of the leading and trailing edges of the pulses developed by a suitable attitude sensor, such as a horizon sensor, located on the spacecraft. Spacecraft spin rate is determined by computing the time of occurrence between successive pulses from a sensor, such as a sun sensor, suitably affixed to a spinning portion of the spacecraft.

Therefore, the times of occurrence of the leading and trailing edges of the attitude sensor pulse(s) and the leading edge of the spin sensor pulse must be stored in appropriate storage devices located at the ground station.

Conventional design procedures dictate the use of individual counters and storage devices (shift registers) associated with each leading or trailing edge. In certain applications, however, the size, space, and power limitations imposed on the ground station equipment configuration may require that the system be more compact than conventional design of the equipment would provide.

In addition thereto as the time required for computer calculation of spacecraft spin rate and attitude is approximately equal to the time between spin sensor pulses, sufficient storage must be provided at the ground station to prevent the loss of data.

SUMMARY OF THE INVENTION

A system stores data representing time differences among leading and trailing edges of a group of sequentially recurring signals. Generation means responsive to the occurrence of an edge generates an address representative of that edge. A counter in response to timing signals generated by a clock supplies a binary count value. In response to the occurrence of an edge, storage means store the binary count value at the address generated by the generation means. A utilization device accesses the binary data stored in the storage means. The counter means is initiated in response to the leading edge of the initial signal in each group of signals.

DESCRIPTION OF A PREFERRED EMBODIMENT

Before proceeding to the detailed description of the system of the embodiment of the present invention, a description of the sun sensor and attitude sensor pulses for a typical spacecraft will be given.

Figure 1:
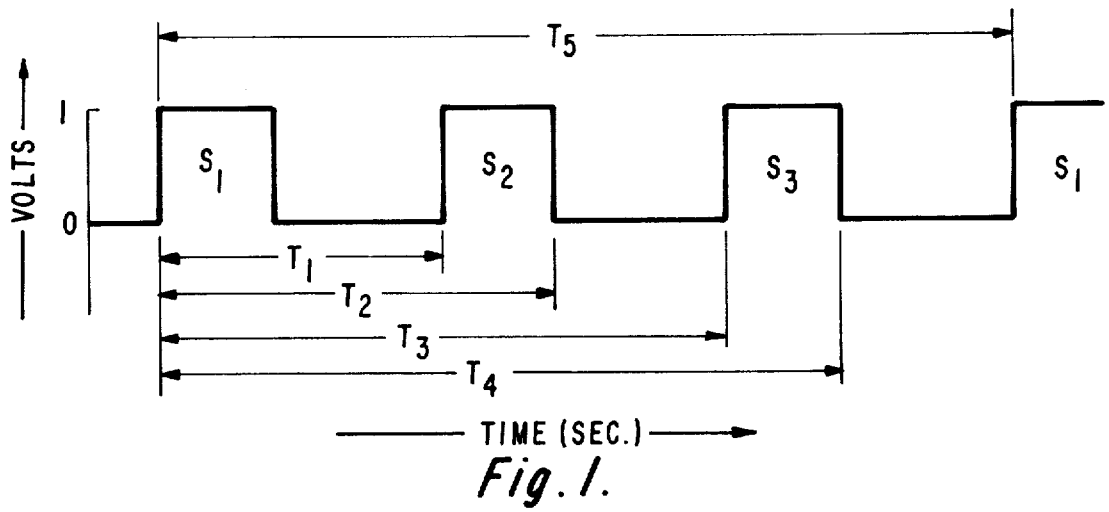
FIG. 1 is a diagram showing the pulsed waveforms associated with the satellite mounted sun and horizon sensors.

Shown in FIG. 1, are the sun sensor and horizon sensor pulses generated by suitable sensors mounted on the spacecraft. The sun sensor pulse train is designated as $S_1$ whereas the pulse train from the attitude sensor, typically a pair of sensors arranged to view the horizon in a "V" configuration, are designated as $S_2$ and $S_3$, respectively. The time $T_5$ between the occurrence of the leading edges of two successive sun sensor pulses is called the frame. The sun sensor is typically mounted on a portion of the spacecraft that is spinning. Thus, the time $T_5$ is an indication of the spacecraft's spin rate. The horizon sensors are suitably mounted on the spacecraft to detect the earth's horizon and generate signals indicative of a deviation of the satellite's spin axis from a position normal to the orbit plane. From the measurement of the time of occurrence of the leading and trailing edges of the horizon sensor pulses $S_2$ and $S_3$ and also the width of each of these pulses, spacecraft attitude can be determined. Thus, for each frame, it is only necessary to determine the times designated in FIG. 1 as $T_1$, $T_2$, $T_3$, $T_4$, and $T_5$ in order to compute spacecraft attitude and spin rate. As can be seen in FIG. 1, $T_5$, the frame, is the time between successive sun sensor pulses; $T_1$ and $T_3$ are the elasped times of occurrence of the leading edges of the two horizon pulses $S_2$ and $S_3$ relative to the leading edge of the sun sensor pulse $S_1$; and $T_2$ and $T_4$, respectively, are the elapsed times of occurrence of the trailing edges of the two horizon sensor pulses $S_2$, $S_3$, relative to the leading edge of the sun sensor pulse. A digital computer can then compute from these times the width of the two horizon sensor pulses $S_2$ and $S_3$ and the spacecraft's spin rate and attitude. It should be appreciated that the frame and the time of occurrence of the horizon sensor's leading and trailing edges may vary from frame to frame, as a result of changes in the spacecraft's attitude and spin rate.

Figure 3:
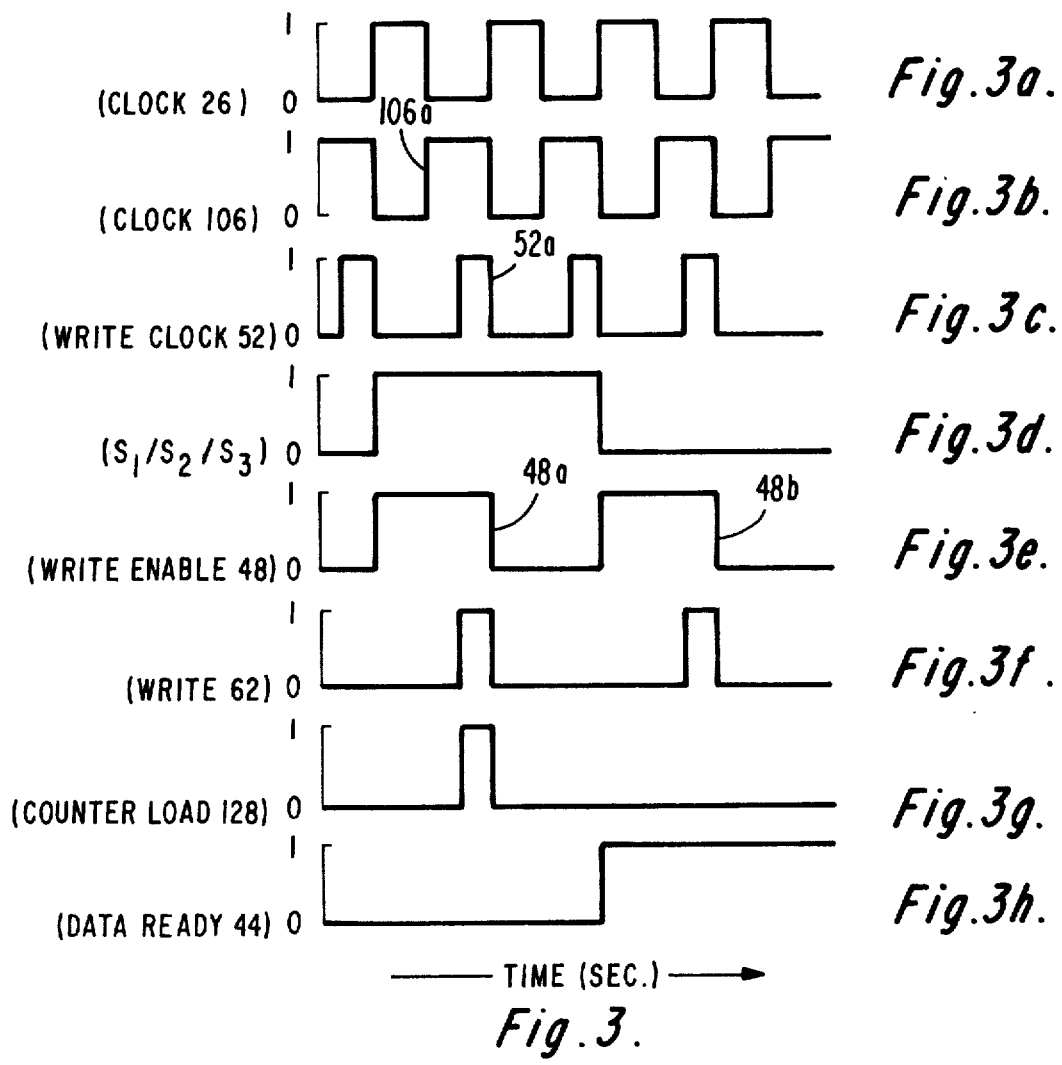
FIG. 3 is a diagram showing the pulsed waveforms associated with the block diagram of FIG. 2.

The operation of the block diagram of FIG. 2 and the associated timing diagram of FIG. 3 will now be described in detail.

A clock source 20 (FIG. 2) typically comprised of an oscillator and suitable logic controls (not shown) generates three common frequency clock signals 26, write 52 and 106. Clocks 26 and 106, as shown in FIGS. 3a and 3b respectively, are 180° out of phase with respect to each other. Write clock 52 is generated as shown in FIG. 3c at the occurrence of a negative pulse from 26 and a positive pulse from 106.

Address latch 24 is typically formed of five triggerable flip-flops. Three of the flip-flops are associated with a respective one of each of the sensor pulses $S_1$, $S_2$ and $S_3$. FIG. 3d shows a typical sensor pulse representative of either $S_1$, $S_2$ or $S_3$. It should be appreciated that the sensor pulses occur asynchronously with respect to clock pulses 26, 52, and 106. For purposes of illustration, the leading edge of a typical sensor pulse is shown in FIG. 3d as occurring simultaneously in time with the leading edge of clock 26. The sensor pulses $S_1$, $S_2$, and $S_3$ are received at the ground station from the satellite by a suitable arrangement (not shown) of an antenna, a receiver, and associated coupling controls, and are connected to their associated flip-flops over signal paths 10, 12, and 14, respectively. At the occurrence of the leading or trailing edge of a sensor pulse, the associated flip-flop is triggered set or reset, respectively, by clock 26. At the occurrence of each leading or trailing edge, latch 24 generates a signal in binary form which is coupled over paths 28, 30, 32, 34, and 36 to read only memory (ROM) 38.

ROM 38 is typically a "field" programmable 256 bit read only memory which is arranged to contain 32 eight bit words. ROM 38 is available as a standard integrated circuit chip such as Texas Instrument type SN 74188. The signal generated by latch 24 represents the address of a data word which is preprogrammed into ROM 38. Three bits of each eight bit ROM data word comprise the lower order three bits of the address of a memory location in random access memory (RAM) 102 corresponding to the associated sensor pulse edge. The highest order address bit of the RAM memory location is supplied from the reset side ($\overline{Q}$) of J/K flip-flop 74 over path 90. In addition, two bits of each ROM data word are connected by paths 40 and 42 to the remaining two of the five flip-flops comprising latch 24. The function of these two flip-flops is to insure, as described below, that each sensor pulse leading or trailing edge addresses a unique ROM data word. Of the three remaining bits associated with each eight bit ROM data word, one bit is not used and the other two bits, data ready 44 and write enable 48, are used, respectively, to signal the computer at the end of each frame and to enable the writing of data accumulated in counter 104 into the location addressed in RAM 102. The width of write enable pulse 48 FIG. 3e) is determined by the period of time the location in ROM 38 containing the write enable bit is addressed. A comparison of FIGS. 3a and 3e shows that the width of the write enable pulse 48 is equal to one period of the clock 26. Write enable pulses (48a and 48b) are generated at the leading and trailing edges respectively of each sensor pulse. The data ready pulse 44 which occurs at the trailing edge of sensor pulse $S_1$ is shown in FIG. 3h.

Figure 2:
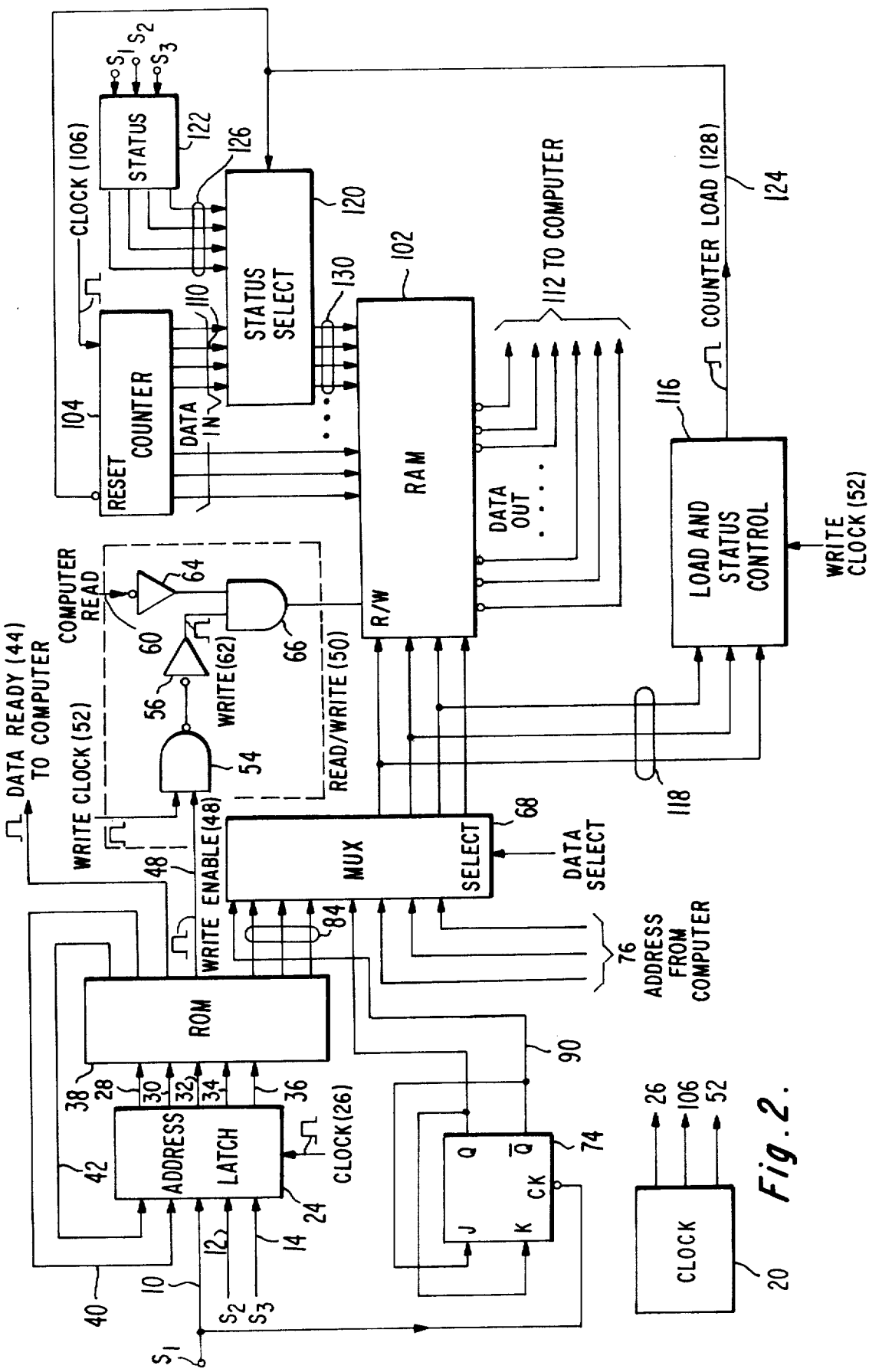
FIG. 2 is a block diagram of the earth station data storage system according to one embodiment of the invention.

The signals generated by latch 24 at the occurrence of each sensor pulse leading and trailing edge and the associated condition of paths 40 and 42 are tabulated in Table I following, where signal paths 28, 30, 32, 34, 36, 40 and 42 of FIG. 2, have been designated as A, B, C, D, E, $Y_1$ and $Y_2$, respectively.

TABLE I

|  | A | B | C | D | E | $Y_1$ | $Y_2$ |
|---|---|---|---|---|---|---|---|
| Leading Edge (LE) $S_2$ and Clock 26 | 0 | 0 | 0 | 1 | 0 | 1 | 1 |
| Next Clock 26 | 1 | 1 | 0 | 1 | 0 | 1 | 1 |
| Trailing Edge (TE) $S_2$ and Clock 26 | 1 | 1 | 0 | 0 | 0 | 0 | 0 |
| Next Clock 26 | 0 | 0 | 0 | 0 | 0 | 0 | 0 |
| LE $S_3$ and Clock 26 | 0 | 0 | 1 | 0 | 0 | 0 | 1 |
| Next Clock 26 | 0 | 1 | 1 | 0 | 0 | 0 | 1 |
| TE $S_3$ and Clock 26 | 0 | 1 | 0 | 0 | 0 | 0 | 0 |
| Next Clock 26 | 0 | 0 | 0 | 0 | 0 | 0 | 0 |
| LE $S_1$ and Clock 26 | 0 | 0 | 0 | 0 | 1 | 1 | 0 |
| Next Clock 26 | 1 | 0 | 0 | 0 | 1 | 1 | 0 |
| TE $S_1$ and Clock 26 | 1 | 0 | 0 | 0 | 0 | 0 | 0 |
| Next Clock 26 | 0 | 0 | 0 | 0 | 0 | 0 | 0 | where a "1" indicates the presence of a signal, a "0," the absence of a signal. It should be understood that the flip-flops comprising latch 24 are clocked to the condition ("0" or "1") shown in Table I at the occurrence of clock pulse 26 immediately following the occurrence of a sensor pulse edge. For example, the clock pulse 26 immediately following the occurrence of the leading edge of the sensor pulse $S_2$ clocks the flip-flops, such that the output of latch 24 is shown in Table I, viz. "00010," for signal paths A, B, C, D, and E, respectively. The signal "00010" represents the address of a location in ROM 38 wherein is stored eight bits including "11" for $Y_1$ and $Y_2$, respectively. As a result of the signals $Y_1$ and $Y_2$ being connected to two of the five flip-flops comprising latch 24, the next clock pulse 26 clocks latch 24 such that the signal on paths A, B, C, D, and E becomes "11010" respectively. At the occurrence of the trailing edge for sensor pulse $S_2$, the signal generated by address latch 24 assumes the condition shown in the table. Thus, the signals designated as $Y_1$ and $Y_2$ insure that a unique memory location is addressed in ROM 38 for each edge of each sensor pulse.

Counter 104, typically a 16 bit binary up counter, is at the beginning of each frame set to a predetermined value. The manner by which counter 104 is set to this predetermined value, typically a count of one, will be described later. Counter 104 is suitably formed of four standard integrated circuit chips, such as Texas Instruments type SN 74193. Counter 104 is up-counted at the occurrence of each clock pulse 106. At the clock pulse 26 immediately following the occurrence of either the leading or trailing edges of the horizon sensor pulses $S_2$ and $S_3$ or the leading edge of the sun sensor pulse $S_1$, the count contained in counter 104 is written into RAM 102. Data transfer between counter 104 and RAM 102 is effected over the data-in (DIN) lines 110. Typically there are 16 such lines, each line being associated with a respective one of the 16 bits comprising counter 104. Four of the 16 lines are coupled to RAM 102 through status select 120, which functions as a multiplexer or select either the lower order four bits of counter 104 or the four bits of sensor pulse status data which is available from status circuit 122.

RAM 102, typically formed of a 16 word by 16 bit memory, is available as a combination of four standard integrated circuit chips such as Texas Instruments type SN 74118. The memory is divided into two halves, each half having the capability of storing up to eight 16 bit words. Of the eight words comprising each half of memory 102, five words are used to store the count in counter 104 corresponding to the times designated as $T_1$, $T_2$, $T_3$, $T_4$, and $T_5$ (FIG. 1). Each of the sixteen bits comprising these five words are associated with a respective one of the corresponding sixteen stages comprising counter 104. Of the three words remaining in each half of memory, two are not used; and one word is used, as will be described, for storing data relating to the status of pulses $S_1$, $S_2$, and $S_3$. When data for a complete frame is stored in one half of RAM 102, the data for the next frame is stored in the other half of RAM 102. At the end of each frame, the computer is signalled that a complete frame of data is stored in RAM 102. By dividing RAM 102 in two halves, the computer can read the data stored for the previous frame without interfering with data storage for the subsequent frame.

When data is to be read out of a memory location contained in RAM 102, the lower order three bits of the address of that location are generated by the computer.

The highest order bit of the location is obtained from the set side (Q) of flip-flop 74. The computer generated address and the address generated by the ROM data word are connected over paths 76 and 84, respectively, into multiplexer (MUX) 68. MUX 68 which is available as a standard integrated circuit chip such as Texas Instruments type SN 74157 functions to select either the computer generated address (76) or the address generated by ROM 38. When the computer desires to read the data stored for the previous frame in RAM 102, a data select signal generated by the computer causes MUX 68 to select the computer generated address. In the absence of a data select, MUX 68 selects the address generated by ROM 38.

The highest order bit of either the computer generated or ROM 38 generated address is obtained from the set of reset sides respectively of flip-flop 74. At the occurrence of the trailing edge of the sun sensor pulse, flip-flop 74 is clocked to the opposite state. As the sun sensor pulse corresponds to the end of a frame, the clocking of flip-flop 74 insures that the locations in memory 102 into which data is either written or read during each frame are in opposite halves of the memory. For example, with flip-flop 74 reset, data is written into the higher eight memory locations (9–16) of RAM 102 and the computer reads data out of the lower eight memory locations (1–8) of RAM 102.

One bit of each eight bit data word generated by ROM 38 represents the signal to enable the writing of data contained in counter 104 into RAM 102. The write enable signal 48 is connected from ROM 38 to AND gate 54 where it is ANDED with the write clock 52. The output of AND gate 54 is the write pulse 62 (FIG. 3f) which is coupled through inverter 56 and AND gate 66 to the read/write (R/W) input of RAM 102. A comparison of FIG. 3f with FIGS. 3c and 3e shows that the writing of data into RAM 102 occurs during a simultaneous occurrence of a pulse from clock (52) and the write enable (48) pulse. When the computer desires to read the frame data previously stored in RAM 102 the computer generates, in addition to the data select signal described previously, a read signal which is connected over path 60 and through inverter 64 and AND gate 66 to the read/write input of RAM 102. The computer generated read may occur in time just prior to the generation of an address by ROM 38. As MUX 68 can only select one address at a time, the computer generated read pulse must, therefore, be shorter in time than the ROM generated write pulse so as to thereby prevent the loss of edge information.

At the next write clock 52 following the leading edge of sensor pulse $S_1$, which corresponds to the end of a frame, the count contained in counter 104 is also written into the appropriate location in RAM 102. At the trailing edge of the write clock, counter 104 is reset by a counter load signal 128 generated by the load and status control 116. The counter load signal 128 is connected to counter 104 by path 124.

Load control 116 which is coupled to the output of MUX 68 by conduction paths 118 is suitably arranged to decode the address of the memory location in RAM 102 corresponding to the leading edge of sensor pulse $S_1$. At the occurrence of the next write pulse, 52a, of clock 52 following the decoding of the address, load control 116 generates counter load signal 128 which resets the counter 104. As a result of the time relationships (FIG. 3) between clock 106 and write clock 52, counter 104 is clocked and thereby up-counted by a pulse (106a) from clock 106 occurring prior to the generation of the counter load signal. Therefore counter 104 must be reset to a count of one, so as to insure that the count for the new frame includes the pulse from clock 106 occurring prior to counter reset. The integrated circuit chips comprising counter 104 are suitably arranged so as to effectuate the resetting of the counter to the desired value.

Status select 102, which is suitably formed from standard integrated circuit chips such as Texas Instruments type SN 74157, functions as a multiplexer to allow the four lower order bits of each of RAM 102 memory location to be loaded with either the lower four bits comprising counter 104 or the information, typically four bits corresponding to the status of the sensor pulses. The status data may, for example, indicate that during the frame last completed a sensor pulse was not received from the satellite at the ground station. The failure to receive a pulse may arise from a malfunction of the sensor. In the event of such a failure, the corresponding memory storage location in RAM 102 contains data which corresponds to the last occurrence of the pulse. The status data contained in RAM 102 is read by the computer and therefore indicates the validity of the data currently stored in the RAM for the last completed frame.

For other than the leading edge of the sun sensor pulse, status select 120 functions such that the four lower order bits of counter 104 are loaded into the corresponding memory location of RAM 102. On the generation of the counter load signal 128 from load and status control 116, status select 120 functions so as to allow the status data from status circuit 122 to be loaded into RAM 102 via buses 130. Status circuit 122 typically formed of flip-flops and associated logic circuits (not shown) monitors the occurrence of the sensor pulses. The failure to receive a sensor pulse is then indicated by status circuit 122 in the four data bits coupled to status select 120 by conduction paths 126. The status data is written into RAM 102 at a time corresponding to the trailing edge of the sun sensor pulse $S_1$.

At the trailing edge of sun sensor pulse $S_1$ the eight bit word generated by ROM 38 contains in addition to the bits described previously a bit (logic "1") which generates the data ready signal 44 (FIG. 3h) to the computer. For all the other sensor pulse leading and trailing edges, the data ready bit is a "0." Data ready 44 indicates that data corresponding to a frame is stored in RAM 102 and is available to be read by the computer. The trailing edge of the sun sensor pulse ($S_1$) also clocks flip-flop 74, thereby allowing the computer to address those locations in RAM 102 which contain data for the last completed frame.

What is claimed is:

1. A system for storing data counts representative of a time difference among leading and trailing edges of a group of sequentially recurring signals, said data counts to be accessed by a utilization device, comprising in combination;
   (a) clock means for generating time signals;
   (b) address generation means responsive to the occurrence of edges of said signals for generating addresses of storage locations for storing binary count values representative of the time spacings of particular edges from a reference edge;
   (c) counter means responsive to said clock means for supplying binary count values representative of time spacings of particular edges from a reference edge;

(d) storage means having storage locations coupled to store said binary count values at the addresses generated by said address generation means for respective edges, (e) means for subsequently supplying addressed binary count values stored in said storage means to said utilization device; and (f) means for initiating the counter means to count to said binary count values from the leading reference edge of the initial signal in said group.

2. The system according to claim 1 wherein said storage means is divided into first and second parts, said first part storing data while said second part supplies data to said utilization device.

3. The system according to claim 2 further including address selection means for alternately coupling address from said utilization device to one of said storage means parts and addresses from said generation means to said other part and including means for alternating the parts in response to the trailing edge of the initial signal in said group.

4. The system according to claim 3 wherein said alternating means is a flip-flop.

5. The system according to claim 1 wherein said storage means is a random access memory.

* * * * *